United States Patent
Ramsey et al.

(10) Patent No.: US 9,740,735 B2
(45) Date of Patent: Aug. 22, 2017

(54) PROGRAMMING LANGUAGE EXTENSIONS IN STRUCTURED QUERIES

(75) Inventors: William D. Ramsey, Redmond, WA (US); Ronnie I. Chaiken, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1616 days.

(21) Appl. No.: 11/936,098

(22) Filed: Nov. 7, 2007

(65) Prior Publication Data
US 2009/0119641 A1 May 7, 2009

(51) Int. Cl.
*G06F 17/30* (2006.01)

(52) U.S. Cl.
CPC .............. *G06F 17/30421* (2013.01)

(58) Field of Classification Search
None
See application file for complete search history.

(56) References Cited

U.S. PATENT DOCUMENTS

| | | | |
|---|---|---|---|
| 5,857,180 A | 1/1999 | Hallmark et al. | |
| 6,009,265 A | 12/1999 | Huang et al. | |
| 6,029,162 A | 2/2000 | Schultz | |
| 6,044,216 A * | 3/2000 | Bhargava ............ | G06F 8/31 717/114 |
| 6,094,714 A | 7/2000 | Roe et al. | |
| 6,112,198 A | 8/2000 | Lohman et al. | |
| 6,341,288 B1 * | 1/2002 | Yach et al. | |
| 6,353,818 B1 | 3/2002 | Carino, Jr. | |
| 6,523,028 B1 | 2/2003 | DiDomizio et al. | |
| 6,578,028 B2 | 6/2003 | Egilsson et al. | |
| 6,594,651 B2 | 7/2003 | Kabra et al. | |
| 6,625,593 B1 | 9/2003 | Leung et al. | |
| 6,738,756 B1 | 5/2004 | Brown et al. | |
| 6,799,184 B2 | 9/2004 | Bhatt et al. | |
| 6,816,848 B1 | 11/2004 | Hildreth et al. | |
| 6,826,753 B1 | 11/2004 | Dageville et al. | |
| 6,968,335 B2 | 11/2005 | Bayliss et al. | |
| 7,010,539 B1 * | 3/2006 | Haas ............... | G06F 17/30569 707/737 |

(Continued)

OTHER PUBLICATIONS

McClure et al. SQL DOM: Compile Time Checking of Dynamic SQL Statements. 27th International Conference on Software Engineering, May 2005, pp. 88-96, Retrieved on [Dec. 23, 2014] Retrieved from the Internet: URL<http://ieeexplore.ieee.org/stamp/stamp.jsp?tp=&arnumber=1553551>.*

(Continued)

*Primary Examiner* — Thuy Dao
*Assistant Examiner* — Cheneca Smith
(74) *Attorney, Agent, or Firm* — Workman Nydegger

(57) ABSTRACT

The insertion and processing of programming language code (e.g., C#) in SQL statements, and the dynamic compiling of the code to detect errors prior to statement execution. The SQL statement with arbitrary programming language code can then be executed concurrently as a query on a computer cluster. External libraries can be imported and the associated functionality leveraged from within a SQL statement. The programming language compiler performs checking at build time, rather than retuning an error during the statement execution against the cluster, a potentially costly proposition in both computing time and human resources.

20 Claims, 9 Drawing Sheets

(56) References Cited

U.S. PATENT DOCUMENTS

| | | | |
|---|---|---|---|
| 7,051,034 B1 | 5/2006 | Ghosh et al. | |
| 7,054,852 B1 | 5/2006 | Cohen | |
| 7,136,873 B2 | 11/2006 | Smith et al. | |
| 7,376,656 B2* | 5/2008 | Blakeley et al. | 717/108 |
| 7,448,022 B1* | 11/2008 | Ram | G06F 8/00 |
| | | | 717/120 |
| 7,577,939 B2* | 8/2009 | Bayardo, Jr. | G06Q 10/10 |
| | | | 709/219 |
| 7,647,580 B2* | 1/2010 | Meijer | G06F 8/31 |
| | | | 717/114 |
| 7,885,969 B2* | 2/2011 | Natarajan et al. | 707/764 |
| 7,895,573 B1* | 2/2011 | Bhargava | G06F 21/554 |
| | | | 717/120 |
| 7,984,058 B2* | 7/2011 | Seidl | G06F 17/30392 |
| | | | 707/759 |
| 8,447,771 B2* | 5/2013 | Kearsey | G06F 17/30401 |
| | | | 707/759 |
| 8,650,204 B2* | 2/2014 | Liu | G06F 17/30908 |
| | | | 707/759 |
| 2002/0107840 A1* | 8/2002 | Rishe | 707/3 |
| 2002/0198867 A1 | 12/2002 | Lohman et al. | |
| 2003/0195862 A1* | 10/2003 | Harrell, Jr. | G06F 17/3056 |
| 2004/0103073 A1 | 5/2004 | Blake et al. | |
| 2004/0148273 A1 | 7/2004 | Allen et al. | |
| 2005/0015369 A1* | 1/2005 | Styles et al. | 707/4 |
| 2005/0097078 A1 | 5/2005 | Lohman et al. | |
| 2005/0131877 A1 | 6/2005 | Ghosh et al. | |
| 2005/0131893 A1 | 6/2005 | Von Glan | |
| 2005/0166181 A1* | 7/2005 | Grieskamp | G06F 8/31 |
| | | | 717/114 |
| 2005/0177557 A1 | 8/2005 | Ziauddin et al. | |
| 2005/0262045 A1 | 11/2005 | Tsuchida et al. | |
| 2006/0041584 A1* | 2/2006 | Debertin et al. | 707/103 R |
| 2006/0123009 A1 | 6/2006 | Bruno et al. | |
| 2006/0136396 A1 | 6/2006 | Brobst | |
| 2007/0006128 A1* | 1/2007 | Chowdhary | G06F 17/30395 |
| | | | 717/104 |
| 2007/0050328 A1 | 3/2007 | Li et al. | |
| 2007/0226178 A1 | 9/2007 | Ewen et al. | |
| 2007/0226186 A1 | 9/2007 | Ewen et al. | |
| 2007/0250470 A1* | 10/2007 | Duffy | G06F 17/30445 |
| 2008/0133492 A1* | 6/2008 | Meijer | G06F 17/30489 |
| 2009/0077011 A1* | 3/2009 | Natarajan et al. | 707/2 |

OTHER PUBLICATIONS

Van den Brink et al. Quality Assessment for Embedded SQL. Seventh IEEE International Working Conference on Source Code Analysis and Manipulation, 2007, pp. 163-170, Retrieved on [Dec. 23, 2014] Retrieved from the Internet: URL<http://ieeexplore.ieee.org/stamp/stamp.jsp?tp=&arnumber=4362910>.*

McClure et al. SQL DOM: Compile Time Checking of Dynamic SQL Statements. 27th International Conference on Software Engineering, May 2005, pp. 88-96, Retrieved on [Apr. 14, 2017] Retrieved from the Internet: URL<http://ieeexplore.ieee.org/stamp/stamp.jsp?arnumber=1553551>.*

Van den Brink et al. Quality Assessment for Embedded SQL. Seventh IEEE International Working Conference on Source Code Analysis and Manipulation, 2007, pp. 163-170, Retrieved on [Apr. 14, 2017] Retrieved from the Internet: URL <http://ieeexplore.ieee.org/xpls/icp.jsp?arnumber=4362910>.*

Isard, et al., "Dryad: Distributed Data-Parallel Programs from Sequential Building Blocks", ACM, 2007, pp. 14.

Carlstrom, et al., "The ATOMO Transactional Programming Language", ACM, 2006, pp. 13.

Yang, et al., "Map-Reduce-Merge: Simplified Relational Data Processing on Large Clusters", ACM, 2007, pp. 1029-1040.

Pike, et al., "Interpreting the Data: Parallel Analysis with Sawzall", Scientific Programming—Dynamic Grids and Worldwide Computing, vol. 13 No. 4, Oct. 2005, pp. 1-33.

Cyran et al. "Oracle9i Database Concepts, Release 2 (9.2)" Mar. 2002.

Green et al. "Oracle9i Database Performance Tuning Guide and Reference, Release 2" Oct. 2002.

Ng et al. "On Reconfiguring Query Execution Plans in Distributed Object-Relational DBMS" Parallel and Distributed Systems, 1998.

Kabra et al. "Efficient Mid-Query Re-Optimization of Sub-Optimal Query Execution Plans" ACM SIGMOD Record. vol. 27, No. 2, ACM 1998.

Ng et al. "Dynamic Query Re-Optimization" Scientific and Statistical Database Management, 1999.

Ng et al. "Dynamic Reconfiguration of Sub-Optimal Parallel Query Execution Plans" 1998.

Cole et al. "Optimization of Dynamic Query Evaluation Plans" vol. 23, No. 2 ACM, 1994.

Baer et al. "Parallel Execution in Oracle Database 10g Release 2" Jun. 2005.

Cruanes et al. "Parallel SQL Execution in Oracle 10g" Proceedings of the 2004 ACM SIGMOD International Conference on Management of Data, ACM 2004.

Albert et al. "Data Parallel Computers and the Forall Statement" 3rd Symposium on the Frontiers of Massively Parallel Computation, 1990, pp. 390-396.

Bitton et al. "Parallel Algorithms for the Execution of Relational Database Operations" ACM Transactions on Database Systems, Sep. 1983, vol. 8, No. 3., pp. 324-353.

Blelloch et al. "An Experimental Analysis of Parallel Sorting Algorithms," Theory of Computing Systems, 1994, 33 pages.

Dean et al. "MapReduce: Simplified Data Processing on Large Clusters" Sixth Symposium on Operating System Design and Implementation (OSDI), Dec. 2004, 13 pages.

Dewitt et al. "GAMMA—A High Performance Dataflow Database Machine" 12th International Conference on Very Large Databases, Aug. 1986.

Dewitt et al. "Parallel Database Systems: The Future of High Performance Database Processing or Passing Fad?" CACM, vol. 35, No. 6, Jun. 1992.

Appaci-Dusseau et al. "Cluster I/O with River: Making the Fast Case Common" Input/Output for Parallel and Distributed Systems, May 1999.

Graefe et al. "Dynamic Query Evaluation Plans" International Conference on Management of Data, 1989.

Graefe "Query Evaluation Techniques for Large Databases" CSUR, vol. 25, Issue 2, Jun. 1993.

Graefe "Volcano—An Extensible and Parallel Query Evaluation System" IEEE Transactions on Knowledge and Data Engineering, vol. 6, No. 1, Feb. 1994.

Graefe "Iterators, Schedulers, and Distributed-Memory Parallelism" Software—Practice and Experience, vol. 26(4), Apr. 1996.

Graefe "Executing Nested Queries" Jan. 2003.

Grust "Comprehending Queries" Distinguishing Dissertations in Computer Science, B.G. Teubner, Sep. 2000.

Grust "Monad Comprehensions: A Versatile Representation for Queries" The Functional Approach to Data Management—Modeling, Analyzing, and Integrating Heterogeneous Data, Springer Verlag. 2003.

Grust et al. "Relational Algebra: Mother Tongue—Xquery: Fluent" Twente Data Management Workshop on XML Databases and Information Retrieval (TDM). Jun. 2004.

Gummaraju et al. "Stream Programming on General-Purpose Processors," 38th Annual International Symposium on Microarchitecture (MICRO-38). Nov. 2005.

Hendler et al. "A Dynamic-Sized Nonblocking Work Stealing Queue," Sun Microsystesm Research Report TR-2005-144, Nov. 2005.

Hong "Exploiting Inter-Operation Parallelism in XPRS" International Conference on Management of Data, 1992.

Hudson et al. "Cactis: A Self-Adaptive, Concurrent Implementation of an Object-Oriented Database Management System", ACM Transactions on Database Systems, vol. 14, No. 3 Sep. 1989.

Kiselyov et al. "XML, Xpath, XSLT Implementations as SXML, SXPath, and SXSLT" Proceedings of the International Lisp Conference, 2002.

(56) References Cited

OTHER PUBLICATIONS

Larus et al. "Using Cohort Scheduling to Enhance Server Performance" Usenix Annual Technical Conference, Jun. 2002.
Meijer et al. "Programming with Circles, Triangles, and Rectangles" Proceedings of XML, 2003.
Menon "A Study of Sort Algorithms for Multiprocessor Database Machines" 12th International Conference on Very Large Databases, 1986.
Saltz et al. "Run-Time Parallelization and Scheduling of Loops" Proceedings of the 1st Annual ACM Symposium on Parallel Algorithms and Architectures, 1989.
Schneider et al. "A Performance Evaluation of Four Parallel Join Algorithms in a Shared-Nothing Multiprocessor Environment" Proceedings of the 1989 ACM SIGMOD International Conference on Management of Data, pp. 110-121, 1989.
Schneider et al. "Tradeoffs in Processing Multi-Way Join Queries via Hashing in Multiprocessor Database Machines" 16th International Conference on Very Large Databases, 1990.
Shapiro "Join Proceedings in Database Systems with Large Main Memories" ACM Transactions on Database Systems, vol. 11, No. 3, Sep. 1986.
Stickel "A Unification Algorithm for Associative-Commutative Functions" Journal of the Association for Computing Machinery, vol. 28, No. 3, Jul. 1981.
Tarditi et al. Accelerator: Simplified Programming of Graphics Processing Units for General-Purpose Uses Via Data-Parallelism, Dec. 2005.
Thain et al. "Distributed Computing in Practice: The Condor Experience" Concurrency and Computation: Practice and Experience, vol. 17, No. 2-4, pp. 323-356. Feb.-Apr. 2005.
Thies et al. "StreamIt: A Language for Streaming Applications" Proceedings of the International Conference on Compiler Construction, Apr. 2002.
Trinder et al. "Algorithm + Strategy = Parallelism" Journal of Functional Programming, Jan. 8, 1998.
Zeller et al. "An Adaptive Hash Join Algorithm for Multiuser Environments" 16th International Conference on Very Large Databases, Aug. 1990.
Box et al. "The LINQ Project: NET Language Integrated Query" Sep. 2005.
Keuhn et al. "Transaction Specification in Multi Database Systems Based on Parallel Logic Programming" 1991IEEE, pp. 110-117.
Ganguly et al. "Query Optimization for Parallel Execution" 1992 ACM Sigmod, Jun. 1992, California, USA, pp. 9-18.
Lu et al. "Optimization of Multi-Way Join Queries for Parallel Execution" Proceedings of the 17th International Conference on Very Large Databases, Barcelona, Sep. 1991, pp. 549-560.
U.S. Appl. No. 11/379,946, dated Apr. 17, 2008, Office Action.
U.S. Appl. No. 11/379,946, dated Sep. 26, 2008, Office Action.
U.S. Appl. No. 11/379,946, dated Apr. 15, 2009, Office Action.
U.S. Appl. No. 11/379,946, dated Nov. 30, 2009, Office Action.
U.S. Appl. No. 11/379,946, dated May 24, 2012, Office Action.

\* cited by examiner

PROGRAMMING LANGUAGE EXTENSIONS IN STRUCTURED QUERIES

BACKGROUND

Distributed computing has been investigated for many years in distributed database work. Unlike running an operation on a single computer, a distributed computation cannot share memory between processes and a variety of strategies are used to make the computations more efficient or, in some cases, even possible.

In general, there are a few common constructs used in distributed computations: partitioning the data into buckets (referred to as a "Map" operation), aggregating parallel outputs, processing data in parallel, and joining two parallel outputs.

Creating distributed applications is challenging for several reasons. It is difficult to master some of the distributed computing concepts listed above and once the programmer masters enough of the concepts applying those concepts to some actual code is difficult. Moreover, it is difficult to write the code because developers completely sure how the code will be called, how each step leads into another, and many of the same functions are written from scratch.

Processing increasing amounts of data is critical to the needs of companies that deliver products and services derived from literally billions of disparate data points. As data processing needs expand, the infrastructure to store, manage, and operate on the massive amounts of data must expand as well. A great deal of work has been done on fault-tolerant storage systems and a similar amount of work has been done on parallel-processing algorithms producing Directed Acyclic Graphs (DAGs) for purposes such as Distributed SQL and log-processing systems.

Despite the huge amount of work, the bottom line is that it is still difficult for developers and researchers with ideas to write applications to take advantage of the huge computational advantages of running computations on a cluster.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed technique facilitates the insertion and processing of programming language code (e.g., C#) in SQL statements, and the dynamic compiling of the code to detect errors. The SQL statement with arbitrary programming language code can then be executed concurrently as a query on a computer cluster. This is a powerful feature that allows the average developer with programming language code skills (e.g., C#) the ability to write in SQL and also insert programming language code. The technique allows the output of a computational graph, for example.

Additionally, external libraries can be imported and the associated functionality leveraged from within a SQL statement. The programming language compiler performs checking at build time, rather than retuning an error during the statement execution against the cluster, a potentially costly proposition in both computing time and human resources.

To the accomplishment of the foregoing and related ends, certain illustrative aspects are described herein in connection with the following description and the annexed drawings.

These aspects are indicative, however, of but a few of the various ways in which the principles disclosed herein can be employed and is intended to include all such aspects and equivalents. Other advantages and novel features will become apparent from the following detailed description when considered in conjunction with the drawings.

DETAILED DESCRIPTION

Figure 1:
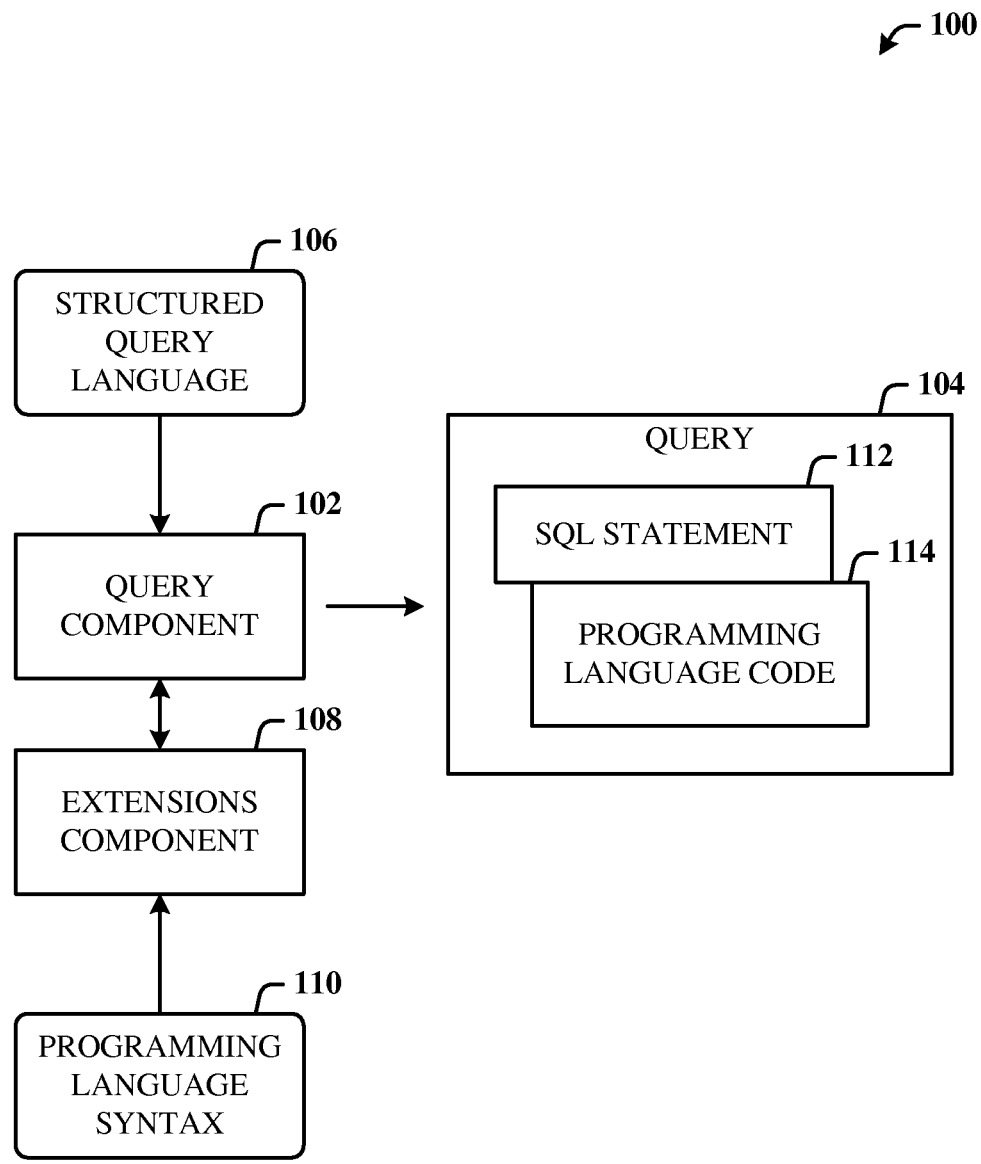
FIG. 1 illustrates a computer-implemented system for generating parallel-processing queries.

The disclosed architecture facilitates extending a SQL (structured query language)-like language with programming language syntax (e.g., C#), thereby providing greater flexibility in terms of what a single query statement can do. Developers can now either write custom extension functions and/or leverage libraries of existing functions. Additionally, the program language compiler (e.g., C#) can catch errors at compile time rather than runtime, since query jobs can sit in a queue for an excessive amount of time before being executed and then determining that an error needs fixing, in which case the query will need to be re-run.

External libraries can be imported and the associated functionality leveraged from within an SQL statement. In a cluster computing system, the building of directed acyclic graphs (DAGs) and underlying SQL system can be leveraged when performing extensions such as the "Product" aggregator or transforming the data using operators. For example, WHERE and HAVING statements can perform complex actions and leverage the programming language (e.g., C#) capabilities.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates a computer-implemented system 100 for generating parallel-processing queries. The system 100 includes a query component 102 for creating a structured query 104 according to a structured query language 106. An extensions component 108 of the system 100 facilitates the receiving and inserting of programming language syntax 110 as part of the structured query 104. The resulting query 104 can include an SQL statement(s) 112 along with programming language code 114. The programming language can be C#, for example, or other programming languages.

The system 100 can be utilized for creating and executing structured queries in parallel across a computer cluster, for example, where large sources of data are stored and can be searched.

There are at least two areas where the SQL syntax can be extended: operators and aggregators. Note that although the description is in the context of the C# programming language, it is to be understood that any other programming language can be employed for extending the disclosed SQL technique.

An operator allows the developer to specify some operation in code to perform a transformation. For example, if the developer wanted to take a number as input and perform an operation (e.g., add five to the number), this can be expressed as follows:

SELECT a+5
FROM input
SCHEMA a,int

Alternatively, this can be expressed as follows:

```
SELECT AddFunction(a)
FROM input
SCHEMA a,int
<c# block="AddFunction" command="SQL" >
    public static int AddFunction(int a)
    {
        return a + 5;
    }
</c#>
```

Figure 2:
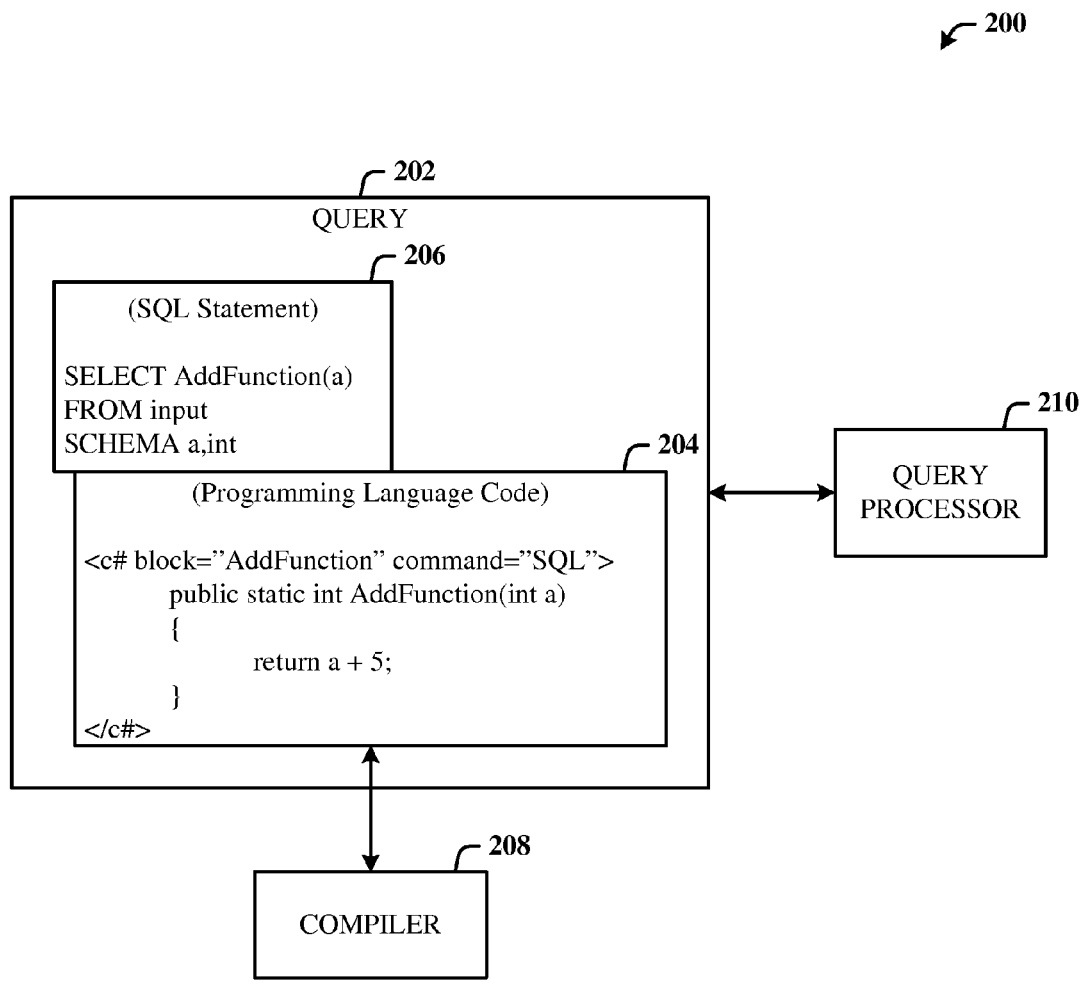
FIG. 2 illustrates a system for processing an exemplary query that employs C# code in combination with an SQL statement.

In the case above, the "AddFunction" method is compiled using the C# compiler. Since the "type" of object a has been defined by the "SCHEMA" keyword as an integer, the compiler will know how to process a. FIG. 2 illustrates a system 200 for processing an exemplary query 202 that employs C# code 204 in combination with an SQL statement 206. The statement 206 and code 204 are that which is provided as the example above. In operation, a compiler 208 receives and compiles the code 204 so that errors can be detected early, rather than expending an excessive amount of time waiting for query execution and then correcting errors when the query fails by a query processor 210.

When using the C# compiler directly, other flexibilities can be exploited:

SELECT System.Math.Min(0,a+10))
FROM input
SCHEMA a,int

Here, "System.Math.Min" is a function inside a .NET library, for example. (.NET is a software framework by Microsoft Corporation that provides interoperability between software solutions and Microsoft operating systems.)

An aspect about SQL is being able to perform "Aggregate" operations such as "Count", "Min", "Max", "Sum", and "Average" over data as part of grouping operations. For example, in the dataset below,

| A | 1 |
| A | 2 |
| A | 3 |
| B | 10 |
| B | 20 |
| B | 30 |

The output from the query:

SELECT Name,Count(ID),Sum(ID),Min(ID),Max(ID)
FROM input
SCHEMA Name,string:ID,int
GROUPBY Name is the following:

| A | 3 | 6 | 1 | 3 |
| B | 3 | 60 | 10 | 30 |

Suppose it is desired to add another aggregator that would output the product of all the values for all A's or B's. Rather than calling a built-in aggregator, an aggregator interface can be defined and utilized. For example, consider the following interface:

```
public interface ISQLAggregator
{
    void Add(object o);
    object Output { get;}
    string OutputType { get;set;}
}
```

The three methods are Add, Output, and OutputType. Add gets called for every input line in the file, and the aggregated quantity gets updated. Output gets called after the last key has been seen, and the aggregated quantity is reset. OutputType is the output type that is useful for the compiler.

That can be implemented for the product as:

```
SELECT Name,Count(ID),Sum(ID),Min(ID),Max(ID),_Product_(ID)
FROM input
SCHEMA Name,string:ID,int
GROUPBY Name
<c# block="Product" command="SQL" >
    public class Product : SQL.ISQLAggregator
    {
        int _product = 1;
        string _type = "int";
        public Product( ){ }
        // implementation for Add method
        public void Add(object o)
        {
            _product *= (int) o;
        }
        // implementation for Output method
        public object Output
        {
            get
            {
                int returnValue = _product ;
                _product = 1;
                return returnValue ;
            }
        }
        // implementation for OutputType method
        public string OutputType { get { return _type; }
set { _type = value; } }
    }
</c#>
```

Note that the "Product" aggregator is called by the convention "_Product_". This allows coexisting use of an operator called "Product" and an aggregator called "Product".

While aggregators only make semantic sense at the SELECT level, operators make sense at the SELECT, WHERE, and HAVING levels. In these cases, the "types" of the objects are known a priori and thus, a C# assembly can be constructed on the fly.

Building a WHERE statement in C#. The WHERE clause is called on every line of input text. Since the types of inputs are known from the SCHEMA keyword, a WHERE function can be constructed that gets compiled. For example:

SELECT Hash1,MaxUrl
FROM FlippingResults_5_03.txt
SCHEMA Query,string:Impressions,int:Clicks:MaxUrl, string
WHERE MaxUrl !="" && (Clicks>=50 || Impressions >= 500)

implies a C# function,

```
public bool WHERE(string Query, int Impressions, string MaxUrl)
{
    return MaxUrl != "" && (Clicks >= 50 || Impressions >= 500);
}
```

Building a HAVING statement in C#. Similarly, a HAVING statement can be applied to a SELECT statement with a grouping, SELECT Query, Sum(Clicks) as SumClick,_Product_ (AddFunction (Impressions)) as Product
FROM FlippingResults_5_03.txt
SCHEMA Query,string:Impressions,int:Clicks:MaxUrl, string
GROUPBY Query,Hash1,Hash2
HAVING SumClick>0 implies a C# function,

```
public bool HAVING(object Query, double SumClick, int Product)
{
    return SumClick > 0;
}
```

The type "double" is obtained from the SumAggregator's OutputType method and "int" is the output from the Product Aggregator. Note the arguments are obtained from the OutputType of the aggregator and the name of the output variable (e.g., "as SumClick" means the output variable is SumClick).

Building a SELECT statement in C#. The SELECT function in C# uses aggregators and operators. To build a SELECT function, each clause in the SELECT statement returns an object (e.g., Query, Sum(Clicks), etc.) that serve as inputs. For example, in the above SELECT statement there are three clauses which get generated:

| C# Operator Code | Aggregator |
| --- | --- |
| Query | DefaultAggregator |
| Clicks | SumAggregator |
| AddFunction(Impressions) | Product (user-supplied) |

These clauses are first processed at the non-aggregated level (e.g., the C# operator code) and then the output is sent to the Aggregator for each clause. The SELECT function is shown in the following example.

```
public object[ ] SELECT(string Query, int Impressions, int Clicks, string MaxUrl)
{
    object[ ] parameters = new object[ __clauses.Count];
    for(int i=0; i<__clauses.Count;++i)
```

-continued

```
    {
        parameters[i] = __clauses[i].Clause;
    }
    return parameters;
}
```

The output from the SELECT function feeds into the aggregators (e.g., DefaultAggregator, SumAggregator, and Product Aggregator).

Figure 3:
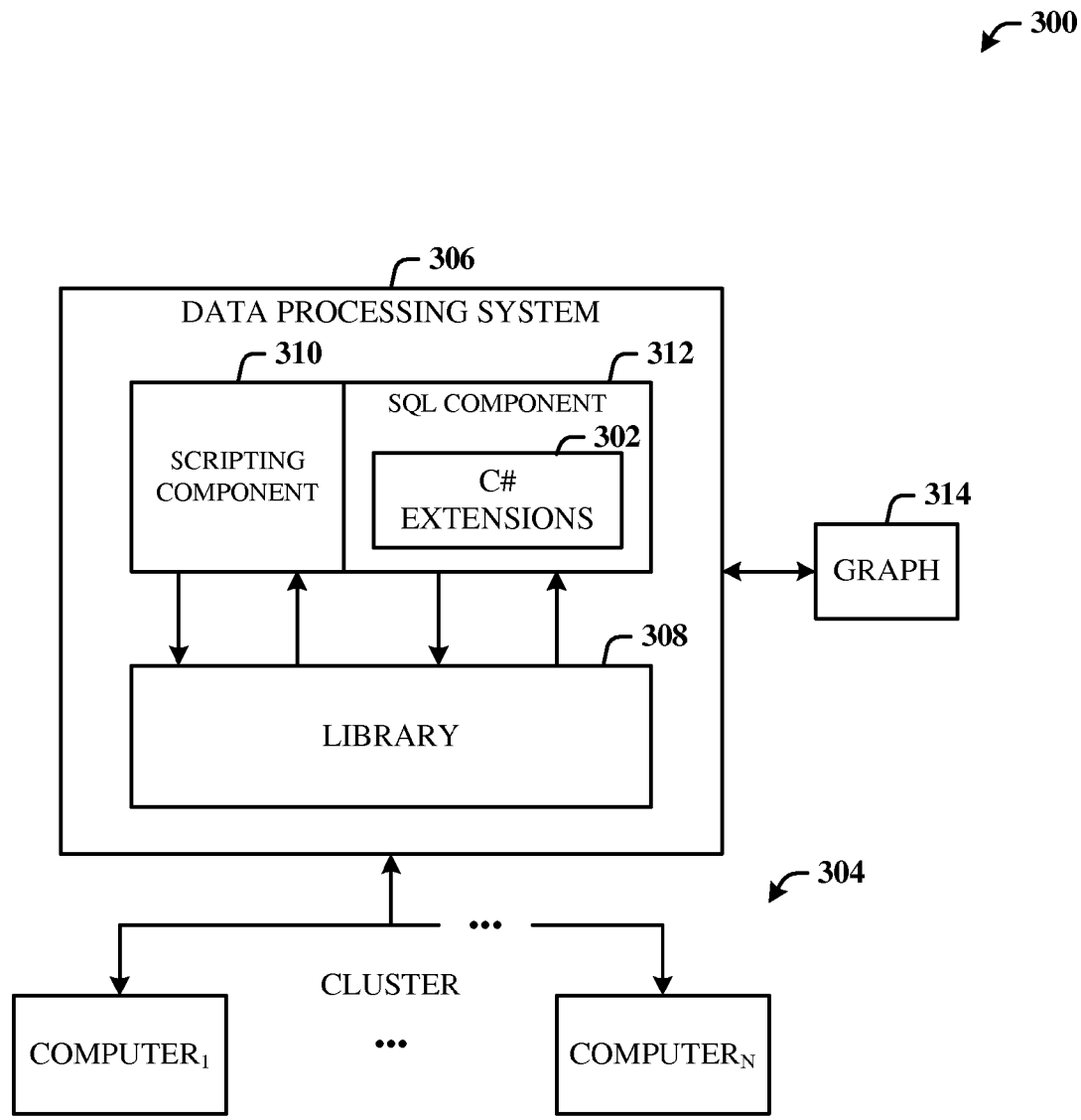
FIG. 3 illustrates a system that employs programming language extensions in SQL statements for computation against data of a computer cluster.

FIG. 3 illustrates a system 300 that employs programming language extensions 302 in SQL statements for computation against data of a computer cluster 304. The system 300 includes a data processing system 306 that interfaces to the computer cluster 304. The data processing system 306 can include a library 308 of functions that can be accessed by a scripting component 310 and a SQL component 312. The extensions (e.g., C#) can be provided via the SQL component 312. An output of the data processing system 306 is not only queries for execution against the cluster 304, but also graphs 314 (e.g., DAGs).

The data processing system 306 facilitates application development for running computations on the cluster 304. For the C# developer, for example, the library 308 abstracts out many of the distributed computing constructs and automatically configures itself to run on the cluster 304 or locally.

The SQL component 312 provides a textual layer similar to SQL syntax that calls into the library 308. This allows many computations such as obtaining data matching certain criteria (e.g., the standard SELECT*WHERE A=B) as easy as writing a text statement. In cases where a simple SELECT statement is insufficient, The SQL component 312 allows a developer to transform results, since the SQL component 312 can call into the library 308 directly. In addition, the SQL component 312 can co-exist with the scripting component 310 and allow a developer to write scripts easily and use the SQL component 312 to simplify the code (and amount of code) for performing an analysis. Moreover, by baking programming language (e.g., C#) extensibility into the SQL syntax, developers are allowed to extend the range of what can be expressed within SQL statements.

The library 308 allows users to perform data analysis on large datasets (e.g., terabytes or larger) using SQL statements. The underling computation is then generated automatically. The SQL component 312 also allows users to insert SQL statements midway through computations either to simplify the computations or to access the functionality expressible in SQL. Because users are already in a coding environment, the users can take the SQL output and perform further transformations on the output using C#, Perl, or UNIX code, for example, thereby increasing the range of the types of analysis that can be performed. The SQL extensions in C#, for example, allow the developer to perform analysis even more easily and less error prone.

The scripting component 310 piggybacks on top of the library 308 (and library framework) by providing a lightweight scripting environment via which the developer can write distributed applications that perform complex analysis (e.g., without having to create a C# project) by exposing the functionality through an editor. The library 308 (e.g., written in C#) exposes various abstractions for building arbitrary computational graphs. The library 308 allows a developer to write functions (or delegates, in the C# world) that can be used in a variety of configurations to perform different computations. Using the library 308 (and associated framework), developers are able to write code that can be run on literally thousands of machines, as easily as it is to write code that runs on a single machine. The scripting component 310 also lets developers insert Perl, UNIX, and other pieces of existing code into the loop as well, thereby leveraging a whole host of functionality.

Despite the functionality already exposed, there are many data processing needs where SQL can be used to get the desired data without requiring any code, for example, find a number of specific queries, joining two tables together on a field matching various criteria, find the average value of a field, and find the average value of a field, but only for specific users. These processing needs can be expressed in SQL-style statements using a modicum of functionality.

In one embodiment, the syntax is extended via the "SCHEMA" keyword. Since much of the data is not specified by schemas and lives in unstructured files, a SCHEMA keyword can be used to specify "column" names (in a tab-delimited file) and data types to leverage different comparison operations (since comparing "007" and "7" yield different results for strings and integers). In the query above, there are two tables, with the first table having three fields (Query, Url, Count) of corresponding types (string, string, integer). The second table also has three fields (Query2, Url2, Count2) of corresponding types (string, string, integer). This can be formally expressed as:

SCHEMA Query,string:Url,string:Count,int |Query2,string:Url2,string:Count2,int

The SQL statement can be parsed and a query plan can be constructed. This query plan specifies the computations to be run and in what order to match the conditions and outputs specified in the SQL statement.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
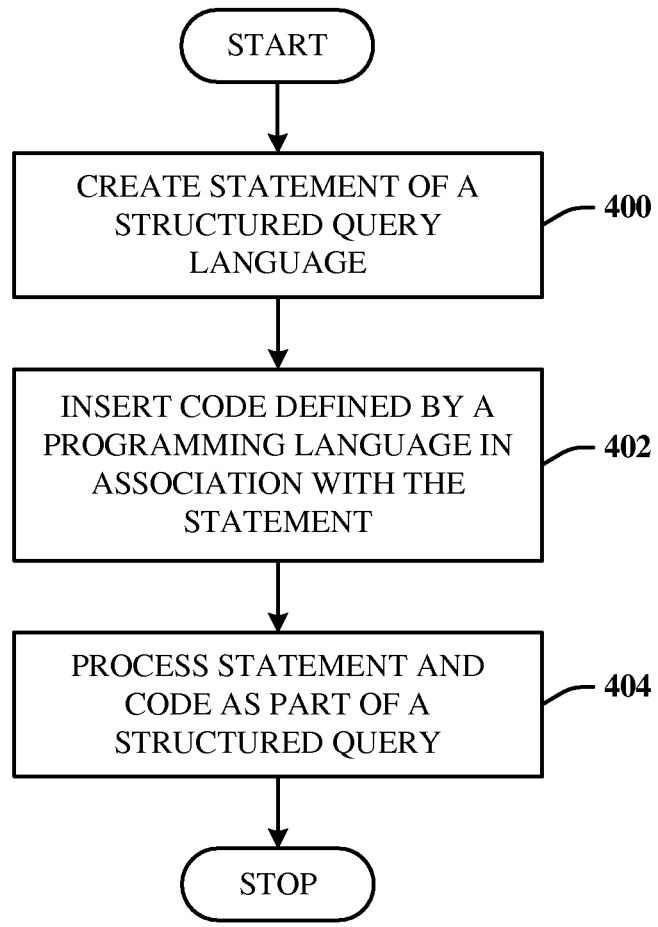
FIG. 4 illustrates a method of creating a structured query.

FIG. 4 illustrates a method of creating a structured query. At 400, a statement of a structured query language is created. At 402, code of a programming language is inserted in association with the statement. At 404, the statement and the code are processed part of a structured query.

Figure 5:
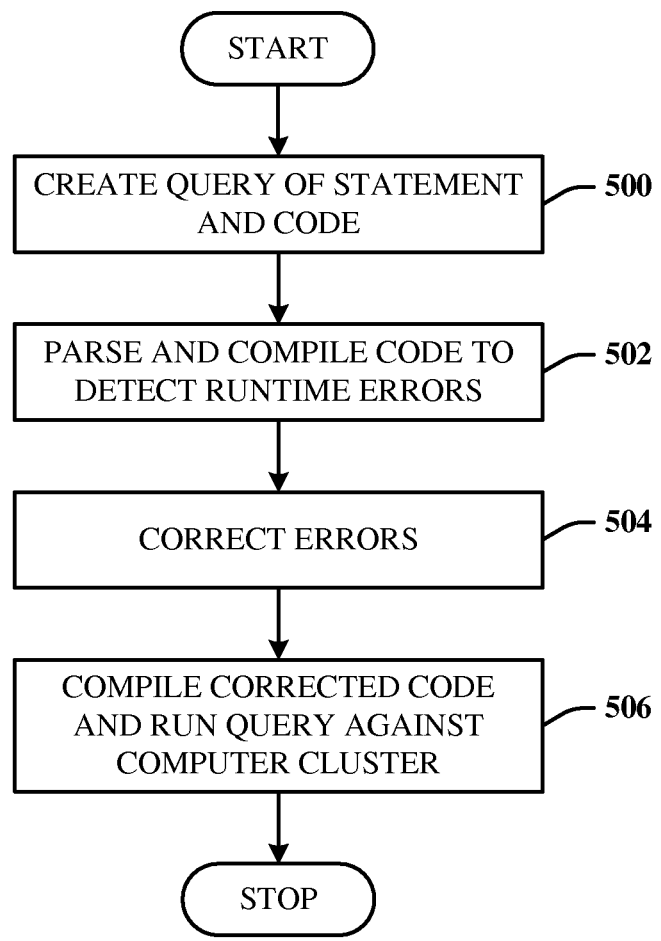
FIG. 5 illustrates a method of processing a query.

FIG. 5 illustrates a method of processing a query. At 500 a query comprising a statement and associated code of a programming language is created. At 502, the code is parsed and compiled to detect runtime errors. At 504, errors are corrected. At 506, the corrected code is compiled and the query is run against a computer cluster.

Figure 6:
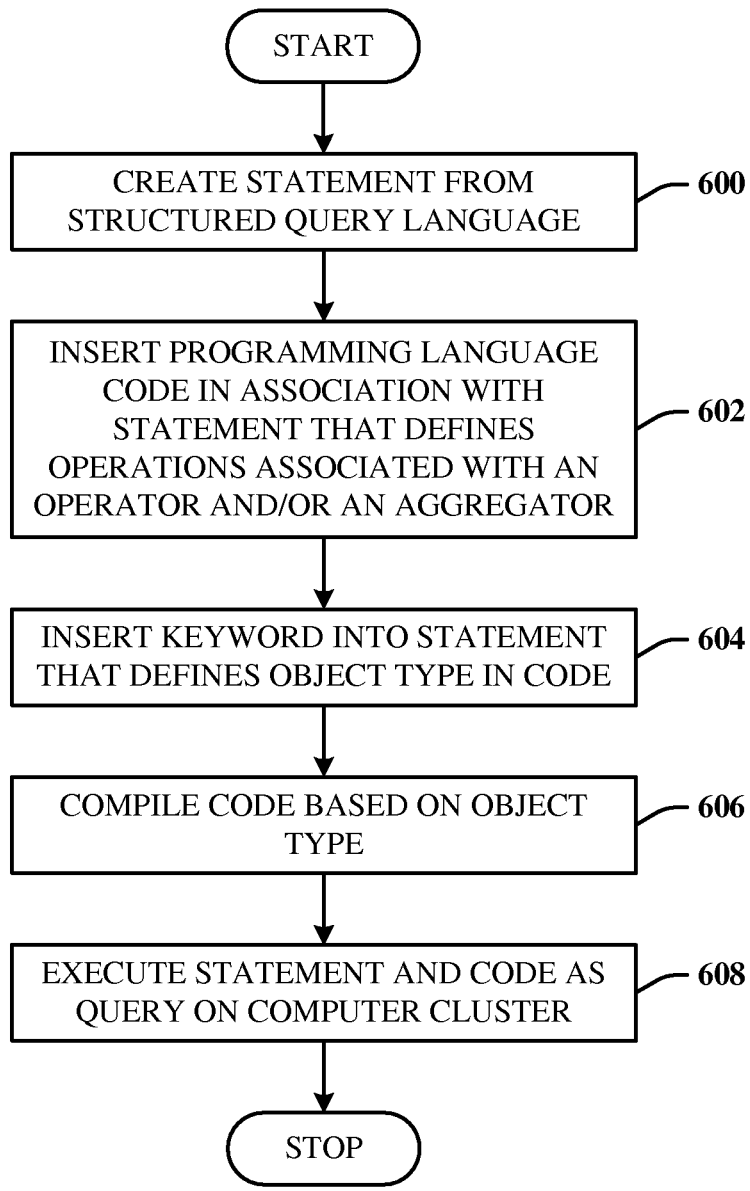
FIG. 6 illustrates an alternative method of creating and processing a query.

FIG. 6 illustrates an alternative method of creating and processing a query. At 600, a statement is created using a structured query language. At 602, programming language code is inserted in association with the statement, the code defining operations associated with an operator and/or an aggregator. At 604, a keyword is inserted into the statement that defines an object type in the code. At 606, the code is compiled based on the object type. At 608, the statement and code are executed as a query on a computer cluster.

Figure 7:
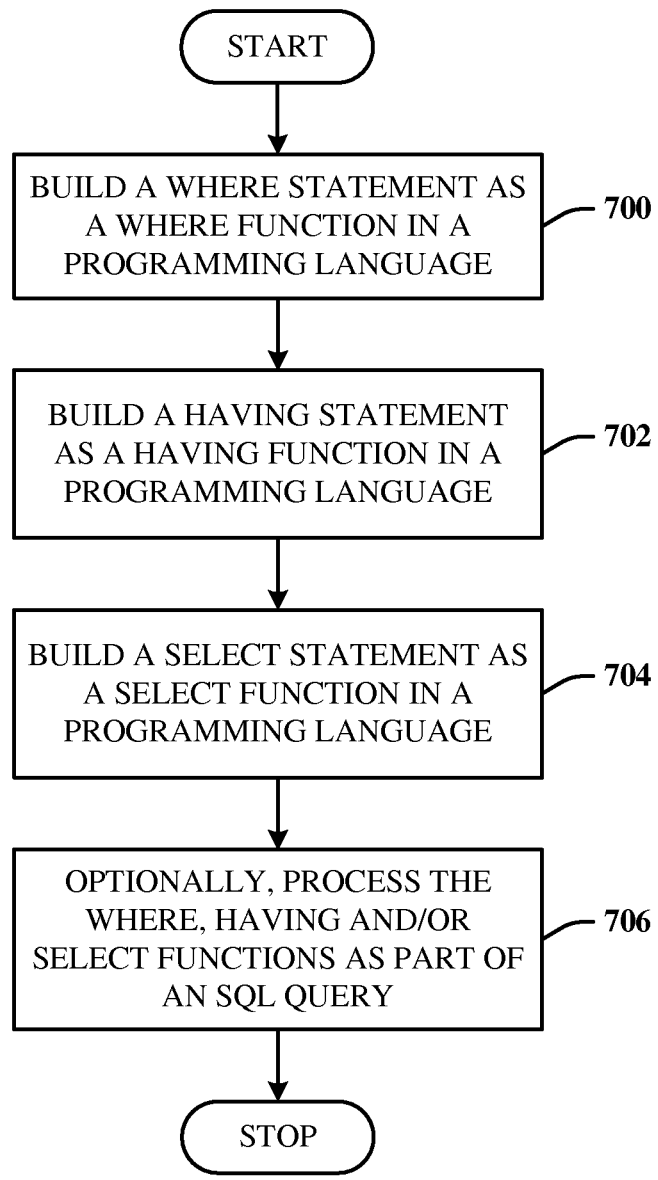
FIG. 7 illustrates a method of processing a SQL query that employs a function.

FIG. 7 illustrates a method of processing a SQL query that employs a function. At 700, a WHERE statement is built as a WHERE function using a programming language. At 702, a HAVING statement is built as a HAVING function using the programming language. At 704, a SELECT statement is built as a SELECT function using the programming language. At 706, optionally, the processing the WHERE function, HAVING function or SELECT function as part of a SQL query.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 8:
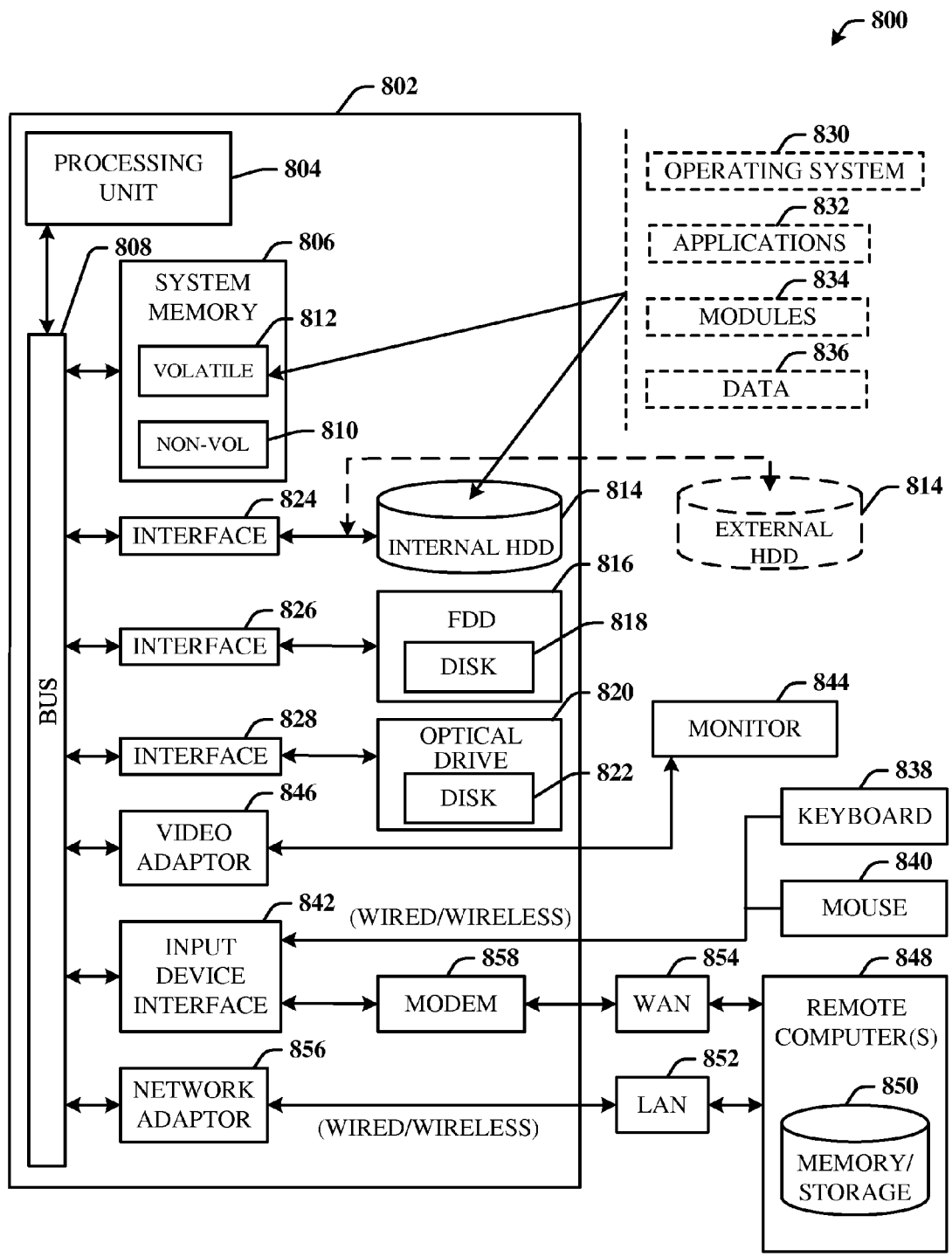
FIG. 8 illustrates a block diagram of a computing system operable to execute the disclosed architecture.

Referring now to FIG. 8, there is illustrated a block diagram of a computing system 800 operable to execute the disclosed architecture. In order to provide additional context for various aspects thereof, FIG. 8 and the following discussion are intended to provide a brief, general description of a suitable computing system 800 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 8, the exemplary computing system 800 for implementing various aspects includes a computer 802 having a processing unit 804, a system memory 806 and a system bus 808. The system bus 808 provides an interface for system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 can include non-volatile memory (NON-VOL) 810 and/or volatile memory 812 (e.g., random access memory (RAM)). A basic input/output system (BIOS) can be stored in the non-volatile memory 810 (e.g., ROM, EPROM, EEPROM, etc.), which BIOS stores the basic routines that help to transfer information between elements within the computer 802, such as during start-up. The volatile memory 812 can also include a high-speed RAM such as static RAM for caching data.

The computer 802 further includes an internal hard disk drive (HDD) 814 (e.g., EIDE, SATA), which internal HDD 814 may also be configured for external use in a suitable chassis, a magnetic floppy disk drive (FDD) 816, (e.g., to read from or write to a removable diskette 818) and an optical disk drive 820, (e.g., reading a CD-ROM disk 822 or, to read from or write to other high capacity optical media such as a DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 812, including an operating system 830, one or more application programs 832, other program modules 834, and program data 836. The one or more application programs 832, other program modules 834, and program data 836 can include the query component 102, the query 104, structured query language 106, extensions component 108, programming language syntax 110, SQL statement 112, programming language code 114, query 202, code 204, statement 206, compiler 208, query processor 210, extensions 302, data processing system 306, library 308, scripting component 310, SQL component 312, and graph 314, for example.

All or portions of the operating system, applications, modules, and/or data can also be cached in the volatile memory 812. It is to be appreciated that the disclosed architecture can be implemented with various commercially available operating systems or combinations of operating systems.

A user can enter commands and information into the computer 802 through one or more wire/wireless input devices, for example, a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, etc.

A monitor 844 or other type of display device is also connected to the system bus 808 via an interface, such as a video adaptor 846. In addition to the monitor 844, a computer typically includes other peripheral output devices (not shown), such as speakers, printers, etc.

The computer 802 may operate in a networked environment using logical connections via wire and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, is connected to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (or Wireless Fidelity) and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3 or Ethernet).

Figure 9:
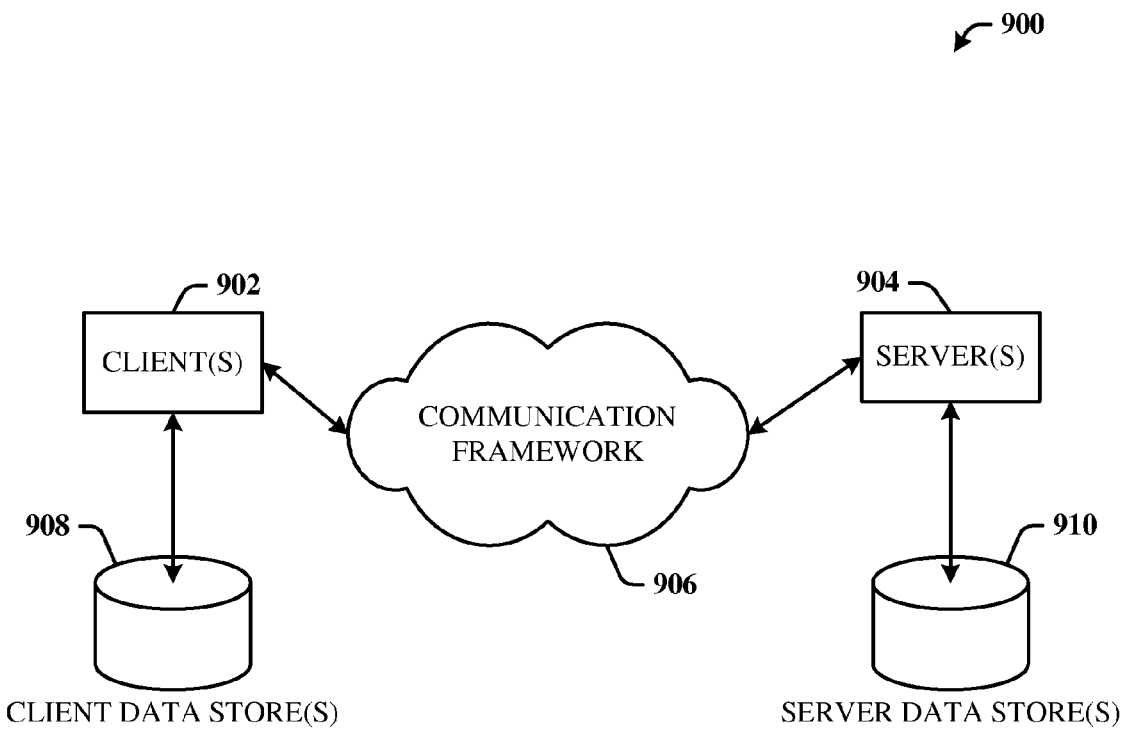
FIG. 9 illustrates a schematic block diagram of an exemplary computing environment for query processing.

Referring now to FIG. 9, there is illustrated a schematic block diagram of an exemplary computing environment 900 for query processing. The environment 900 includes one or more client(s) 902. The client(s) 902 can be hardware and/or software (e.g., threads, processes, computing devices). The client(s) 902 can house cookie(s) and/or associated contextual information, for example.

The environment 900 also includes one or more server(s) 904. The server(s) 904 can also be hardware and/or software (e.g., threads, processes, computing devices). The servers 904 can house threads to perform transformations by employing the architecture, for example. One possible communication between a client 902 and a server 904 can be in the form of a data packet adapted to be transmitted between two or more computer processes. The data packet may include a cookie and/or associated contextual information, for example. The environment 900 includes a communication framework 906 (e.g., a global communication network such as the Internet) that can be employed to facilitate communications between the client(s) 902 and the server(s) 904.

Communications can be facilitated via a wire (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer system, comprising:
   a distributed computer cluster;
   one or more processors; and
   one or more computer readable storage media having stored thereon computer-executable instructions that are executable by the one or more processors to cause the computer system to generate parallel-processing queries, the computer-executable instructions including instructions that are executable to cause the computer system to perform at least the following:
   create a structured query according to a structured query language, the structured query being created for execution in parallel across the distributed computer cluster; and;
   receive programming language syntax that comprises a functions;
   insert the received programming language syntax into the structured query of the structured query language such that a resulting query includes a structured query language statement in combination with programming language code that specifies both an aggregation and an operation;
   insert a keyword into the resulting query that defines an object type in the programming language code;
   compile the programming language code, wherein compiling the programming language code is performed based on the object type defined by the inserted keyword; and
   execute the resulting query, including both the structured query language and the programming language code, in a distributed manner on the distributed computer cluster.

2. The method of claim 1, wherein the programming language syntax can be parsed and compiled by a compiler.

3. The system of claim 2, wherein the compiler is a C# compiler.

4. The system of claim 1, wherein the syntax is employed with an operator.

5. The system of claim 1, wherein the syntax is employed with an aggregator.

6. The system of claim 1, wherein the syntax calls a function from a library of functions.

7. The system of claim 1, wherein the syntax calls a function from a library, the execution of which occurs as part of executing the query.

8. The system of claim 1, wherein the aggregation and operation use a same name that coexists in the programming language code.

9. The system of claim 1, wherein the programming language code is checked for errors at compile time.

10. The system of claim 1, wherein a scripting component is used to enable writing of scripts and access to functions of an external library.

11. A method, implemented at a cluster computer system that includes one or more processors, for creating a structured query, the method comprising:
    creating a structured query according to a structured query language, the structured query being created for execution in parallel across the cluster computer system;
    receiving functions specified in specified in code defined by a programming language, the functions associated with a statement of a structured query language;
    inserting the received programming language into the structured query of the structured query language such that a resulting query includes a structured query language statement in combination with programming language code that specifies both an aggregation and an operation;
    inserting a keyword into the resulting query that defines an object type in the programming language code;
    compiling the programming language code, wherein compiling the programming language code is performed based on the object type defined by the inserted keyword; and executing the resulting query, including both the structured query language and the programming language code, in a distributed manner across the cluster computer system.

12. The system of claim 11, further comprising compiling the code prior to execution of the structured query based on a keyword.

13. The method of claim 11, further comprising calling a function from a library via the structured query.

14. The method of claim 11, further comprising checking for errors at compile time.

15. The method of claim 11, further comprising building a SELECT function using aggregators and operators.

16. The method of claim 11, further comprising utilizing functionality of an external library from within a structured query language statement.

17. A computer program product comprising one or more hardware storage devices having stored thereon computer-executable instructions that are executable by one or more processors of a computer system to cause the computer system to create a structured query, the computer-executable instructions including instructions that are executable to cause the computer system to perform at least the following:
  create a structured query according to a structured query language, the structured query being created for execution in parallel across a computer cluster;
  receive functions specified in code defined by a programming language, the functions associated with a statement of a structured query language;
  insert the received programming language into the structured query of the structured query language such that a resulting query includes a structured query language statement in combination with programming language code that specifies both an aggregation and an operation;
  insert a keyword into the resulting query that defines an object type in the programming language code;
  compile the programming language code, wherein compiling the programming language code is performed based on the object type defined by the inserted keyword; and
  execute the resulting query, including both the structured query language and the programming language code, in a distributed manner across the computer cluster.

18. The computer program product of claim 17, wherein the code is compiled prior to execution of the structured query based on a SCHEMA keyword.

19. The computer program product of claim 17, wherein a function from a library is called via the structured query.

20. The computer program product of claim 17, wherein the aggregation and the operation use a same name that coexists in the programming language code.

* * * * *